United States Patent
Seay et al.

(10) Patent No.: US 9,772,780 B2
(45) Date of Patent: Sep. 26, 2017

(54) METHOD FOR NON-DISRUPTIVELY ALIGNING I/O ACCESS OF A HOST OPERATING SYSTEM WITH THE UNDERLYING STORAGE SYSTEM

(71) Applicant: NetApp, Inc., Sunnyvale, CA (US)

(72) Inventors: Bryan Seay, Cary, NC (US); Joseph Sunday, Apex, NC (US); Keith Bare, II, Pittsburgh, PA (US); Kevin Stovall, Cary, NC (US); Sathya Murthy, Morrisville, NC (US); Vivek Srinivasamurthy, Cary, NC (US)

(73) Assignee: NETAPP, INC., Sunnyvale, CA (US)

( * ) Notice: Subject to any disclaimer, the term of this patent is extended or adjusted under 35 U.S.C. 154(b) by 0 days.

(21) Appl. No.: 14/928,864

(22) Filed: Oct. 30, 2015

(65) Prior Publication Data

US 2017/0123683 A1     May 4, 2017

(51) Int. Cl.
*G06F 12/00*     (2006.01)
*G06F 3/06*      (2006.01)

(52) U.S. Cl.
CPC .......... *G06F 3/0611* (2013.01); *G06F 3/0631* (2013.01); *G06F 3/0632* (2013.01); *G06F 3/0664* (2013.01); *G06F 3/0683* (2013.01)

(58) Field of Classification Search
CPC ...... G06F 12/00; G06F 12/06; G06F 12/0646; G06F 13/00
USPC ......................................... 711/100, 154, 165
See application file for complete search history.

(56) References Cited

U.S. PATENT DOCUMENTS

| | | | | |
|---|---|---|---|---|
| 8,281,084 B2* | 10/2012 | Steinmetz | ............. | G06F 13/426 711/154 |
| 2008/0028157 A1* | 1/2008 | Steinmetz | ............. | G06F 13/426 711/149 |
| 2012/0233434 A1* | 9/2012 | Starks | .................. | G06F 3/0644 711/170 |
| 2012/0265959 A1* | 10/2012 | Le | .................... | G06F 17/30067 711/162 |

* cited by examiner

*Primary Examiner* — Tuan Thai
(74) *Attorney, Agent, or Firm* — Nixon Peabody LLP; Khaled Shami (57) ABSTRACT

Systems, devices, methods, and computer program products are provided for aligning I/O access from a host operating system with the underlying storage system. A storage operating system can be configured to determine, either manually via operator input or automatically, the size of a data offset caused by misaligned I/O access from a host operating system to a first virtual drive. To align I/O access, the storage operating system can initialize a second virtual disk that is partitioned to accommodate the size of the data offset. The storage operating system can copy header information and main data information from the first virtual disk to the second virtual disk as a background process, non-disruptively aligning the I/O access from the host operating system.

20 Claims, 8 Drawing Sheets

910 | Copy header information in a first virtual disk from a first set of sectors allocated for the first virtual disk to a third set of sectors allocated for a second virtual disk 920 | Copy a first subset of main data information from the first set of sectors allocated for the first virtual disk to a fourth set of sectors allocated for the second virtual disk 930 | Copy a second subset of main data information from a second set of sectors allocated for the first virtual disk to the fourth set of sectors, the second subset of main data information subsequent to the first subset of main data information

METHOD FOR NON-DISRUPTIVELY ALIGNING I/O ACCESS OF A HOST OPERATING SYSTEM WITH THE UNDERLYING STORAGE SYSTEM

TECHNICAL FIELD

The present disclosure relates generally to storage systems and more specifically to a technique for enabling a storage operating system to non-disruptively align I/O access of a host operating system with the underlying storage system.

BACKGROUND

Business entities and consumers are storing an ever increasing amount of digital data. For example, many commercial entities are in the process of digitizing their business records and other data, for example by hosting large amounts of data on web servers, file servers, and other databases. Techniques and mechanisms that facilitate efficient and cost effective storage of vast amounts of digital data are being implemented in storage systems. A storage system can include and be connected to multiple storage devices, such as physical hard disk drives, solid state drives, networked disk drives, as well as other storage media. The physical data blocks across the connected storage devices can be divided into numerous storage sectors and partitioned into one or more virtual volumes. Host operating systems, such as variants of Microsoft Windows, Linux or Unix distributions, and other operating systems, may be assigned one or more virtual volumes. The logical storage sectors presented to the host operating system may be of a different size than the underlying physical storage blocks. For example, a storage system that stores data in 4 kB physical data blocks may be presented to the host operating system in 512 byte logical blocks.

The assigned host operating system performs reads and writes (referred herein as "I/O access") with the assigned virtual volume by accessing the logical blocks presented by the storage system to the host operating system. The host operating system may initiate I/O operations at any logical block. If host operating system I/O access begins at a logical block that is the start of an underlying physical data block, the I/O access is aligned. Host operating system I/O access with the underlying storage system may become misaligned when the I/O access begins at a logical block that is not at the start of an underlying physical data block. Misaligned I/O access may increase latency and degrade overall storage performance. It is desirable to have a new method and system that allows a storage system to align host operating system I/O access with an underlying storage system in a non-disruptive manner.

DETAILED DESCRIPTION

Certain embodiments provide systems and methods for enabling a storage operating system to align the I/O access of a host operating system with the physical storage blocks of the underlying storage system. For example, a virtual disk can be assigned to a host operating system, allowing the host operating system to perform input/output (I/O) access with the underlying storage resources. The virtual disk may include storage sectors aggregated and partitioned from multiple connected storage devices, such as hard disk drives, solid-state drives, and other storage media. The virtual disk may comprise a first set of sectors dedicated to header information for the host operating system and a second set of sectors dedicated to the main data information for the host operating system. Header information includes operating system configuration information, such as the master boot record, operating system partitioning table information, and other configuration information. Header information can vary depending on the type of operating system (e.g., Microsoft Windows may utilize header information that is of a different size from header information of a Linux distribution). If the header information of the host operating system is sized differently from the number of sectors of the virtual disk allocated for the host operating system header information, the host operating system I/O access of the main data information may begin after or before the first byte of a physical storage block. The difference in size between the number of sectors allocated for the host operating system header information and the actual size of the header information is referred to as the data offset of I/O access.

In certain embodiments, the storage operating system determines the size of the data offset and aligns I/O access of the host operating system by initializing a new virtual disk that is partitioned to accommodate the identified data offset. For example, to initiate the second virtual disk, the storage operating system creates the new virtual disk with a third set of sectors allocated from the connected storage devices and dedicated to the host operating system header information. The number of sectors allocated as the third set of sectors is different from the number of sectors in the first set of sectors (which were originally allocated for the header information) based on the size of the data offset. The storage operating system allocates a fourth set of sectors for the main data information of the host operating system. By accommodating for the data offset, the second virtual disk is partitioned to accommodate the actual size of the host operating system header information.

The storage operating system reassigns the host operating system to the second virtual disk without disrupting access to the host operating system. For example, the storage operating system copies the header information and main data information from the first virtual disk to the second virtual disk and continues I/O operations for the host operating system with the underlying connected storage devices. With the corrected size for the header area in the second virtual disk, I/O access of the main data information from the host operating system can occur at the start of a physical storage block (i.e. I/O access by the host operating system is thereby aligned).

Figure 1:
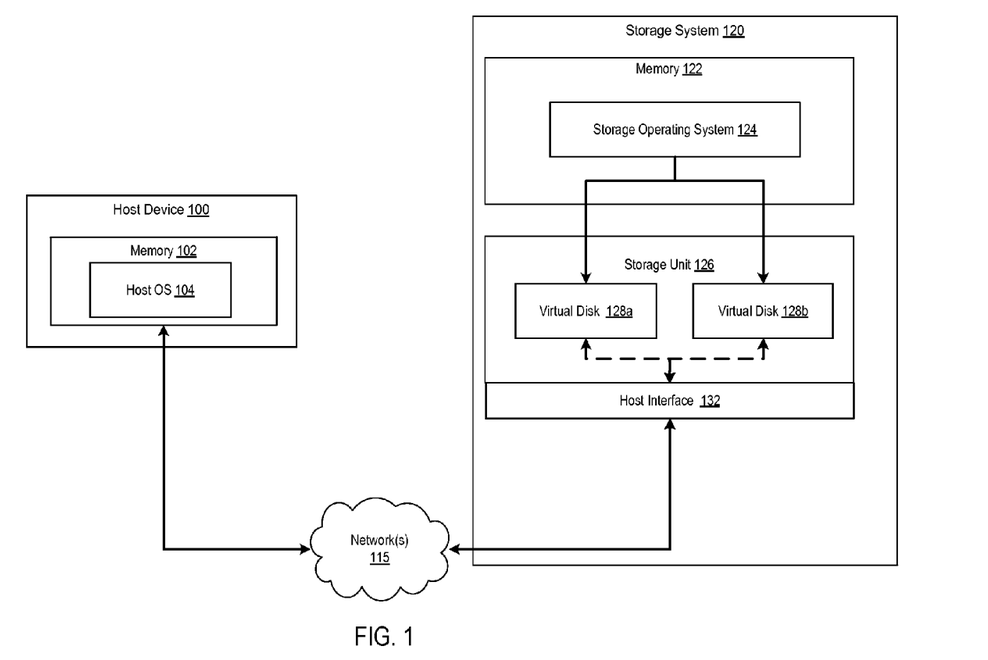
FIG. 1 is a block diagram illustrating a computing system according to certain exemplary embodiments, where a storage system provides a host device access to a storage unit via one or more virtual disks.

Referring now to the drawings, FIG. 1 is a block diagram illustrating an example of a computing system including storage system 120 that provides a host device 100 access to a storage unit 126 via one or more virtual disks. The host device 100 includes a memory 102 executing a host operating system 104. Host operating system 104 can include any suitable operating system, such as any version of Microsoft Windows, Unix, Linux, Solaris distributions, and others. The program code for the host operating system 104 can be stored either in storage media in the host device 100 or in the storage unit 126 of the storage system 120. The storage system 120 also includes a memory 122 executing a storage operating system 124. Memory 102 and memory 122 include non-transitory computer-readable media suitable for storing and executing program code and other data.

The memory 122 of the storage system can be communicatively coupled to a storage unit 126. Storage unit 126 includes one or more connected storage devices (not shown), such as hard disk drives, solid states drives, and other storage media. While storage unit 126 is shown as included in storage system 120 for illustrative purposes, storage unit 126 can also be separate from and remote from storage system 120. A remote storage unit 126 can also include storage media such as networked hard disk drives.

The storage system 120 includes a host interface 132 for providing I/O access to host device 100. The host device 100 can communicate with the storage system 120 and access the host interface 132 over one or more network(s) 115. Host interface 132 includes, for example, an Ethernet interface or wireless interface. FIG. 1 shows host device 100 connected to storage system 120 over network(s) 115 for illustrative purposes. In other embodiments, host device 100 can directly access storage system 120 over any suitable I/O interface. For example, host interface 132 can include I/O interfaces such as Fiber Channel, Universal Serial Bus (USB), or Small Computer System Interface (SCSI).

The storage operating system 124 can manage the I/O operations between the host device 100 and the storage unit 126. For example, storage operating system 124 can perform operations to partition the storage resources of the connected storage devices into one or more virtual disks 128a-b. The storage operating system 124 can create a new virtual disk 128 by allocating storage space from the connected storage devices. The storage operating system 124 can also delete data partitions for old virtual disks and recycle the sectors of storage space for new virtual disks. The storage operating system 124 assigns virtual disks 128a-b to host device 100 and other host devices. The virtual disk 128 is presented to host device 100 as a logical unit number (LUN). By referencing an assigned LUN in I/O operations, the host device 100 accesses resources specified in the given virtual disk 128. While the virtual disks 128a-b are virtual in nature as they abstracted storage resources from multiple connected storage devices, the virtual disk 128 is presented to the host device 100 as a physical volume. For example, while a virtual disk 128 may comprise sectors of storage space from various connected storage devices in storage unit 126, the virtual disk 128 is presented to host device 100 as a continuous set of storage sectors (e.g., a single stream of bytes). When assigned a virtual disk 128, the host device 100 can perform I/O operations with the storage unit 126 by reading from or writing to logical block addresses representing the virtual disk 128.

The storage resources of the connected storage devices can comprise of physical data blocks of a given block size. For example, storage resources may comprise physical data blocks 4 kilobytes (4 kB) in size or 8 kB in size as well as other sizes. In creating a virtual disk 128, the storage operating system 120 can partition the 4 kB or 8 kB storage resources into smaller logical blocks. The size of the logical blocks may be defined by the standard used for the host interface 132. For example, the SCSI interface protocol defines logical block sizes as 512 bytes. In the case of a host device 100 accessing the storage system 120 via the SCSI protocol (i.e. if the host interface 132 is a SCSI interface), the host device 100 accesses the assigned virtual disk 128 via 512 byte blocks. The storage operating system 124 can thus initialize a new virtual disk 128 configured for the SCSI interface by partitioning the 4 kB or 8 kB physical blocks into 512 byte logical blocks. The host operating system 104 can perform I/O access at any logical block. Because the host operating system 104 performs I/O access via the assigned virtual disk 128 by addressing the data blocks by offsets that are modulo 512, I/O access can begin before, after, or at the start of a physical block of storage. When I/O access from the host operating system 104 begins at the start of a physical block of storage (e.g., start of a 4 kB or 8 kB physical block), the I/O access of the host operating system 104 is said to be aligned.

Figure 2:
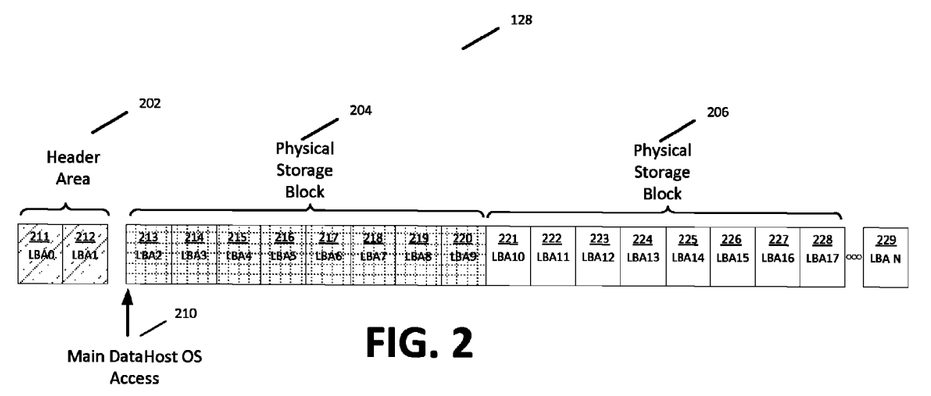
FIG. 2 is a logical block diagram representing a collection of storage sectors for a virtual disk with aligned I/O access from a host operating system, according to certain exemplary embodiments.

FIG. 2 is a logical block diagram representing a collection of storage sectors 211-229 for a virtual disk 128 where I/O access from the host operating system 104 is aligned with the underlying physical storage blocks. The virtual disk 128 shown in FIG. 2 comprises a set of partitioned sectors 211-229 from connected storage devices in storage unit 126. The sectors 211-229 are logical blocks that are accessed by the assigned host device 100 for I/O operations. As used herein, "sectors of storage," "sectors," and "logical blocks" are used interchangeably and both refer to discrete logical storage units partitioned from the underlying physical storage blocks in the connected storage devices. The sectors 211-229 are presented to the assigned host device 100 as logical block addresses (depicted as LBA 0-LBA N, where N can be any number of sectors). For illustrative purposes, each sector 211-229 is a 512 byte logical block. In this example, the underlying physical storage from the connected storage devices comprise data blocks in 4 kB chunks, as shown in physical storage blocks 204, 206. Thus, the sectors 211-229 are partitioned into sets of 4 kB blocks.

As discussed above, a virtual disk 128 partitioned for access by a host operating system 104 includes a section dedicated for header information for the host operating system 104 and a section dedicated for main data information. Header information can include any operating system configuration information such as information regarding the master boot record, partitioning table information, and other configuration information. Main data information can include all main data used by the host operating system 104, including the host operating system 104 image and application data for the host operating system 104. The dedicated storage space for the header information can be included before the logical block address comprising the start of the main data information or after the logical block address comprising the end of main data information. Header information that is included before the main data information can be referred to as a prefix, and header information included after the main data information can be referred to as a suffix.

The virtual disk 128 can be configured by the storage operating system 124 with a first set of sectors 211-212 that form a header area 202 dedicated to header information for the host operating system 104. The header area 202 is shown in FIG. 2 as comprising two-512 byte logical blocks for illustrative purposes, but the header area 202 can comprise any number of logical blocks and may necessarily not be a multiple of the underlying physical storage block size. The storage operating system 124 can set the number of storage sectors that comprise a header area 202 during initialization of the virtual disk 128. The virtual disk 128 also includes a second set of sectors 213-229 that form a main data area dedicated to main data information for the host operating system 104. To define the main data area during initialization of the virtual disk 128, the storage operating system 124 partitions the underlying physical storage blocks 204-206 into the required number of logical blocks. For example, physical storage block 204 is partitioned into eight-512 byte logical blocks (sectors 213-220) and presented to host operating system 104 as logical block addresses LBA2-LBA9. Physical storage block 206 is partitioned into eight-512 byte logical blocks (sectors 221-228) and presented to host operating system 104 as logical block addresses LBA10-LBA17. Logical block address LBA2 (sector 213) corresponds to the start of the physical storage block 204 (i.e byte 0 of physical storage block 204). Similarly, logical block address LBA10 corresponds to the start of the physical storage block 206 (i.e. byte 0 of physical storage block 206). In this example, host operating system 104 accesses logical block addresses LBA0-LBA1 for the host operating system header information. Because sectors 211-229 are logical blocks that are abstractions of physical storage units, the physical storage comprising the header area 202 may or may not be immediately preceding physical storage block 204 and physical storage block 206. For example, sectors 211-212 may be part of physical storage blocks separate from physical storage blocks 204, 206 with other physical storage existing in between header area 202 and physical storage block 204. However, since virtual disk 128 is presented to host operating system 104 as a continuous physical set of blocks, host operating system 104 accesses header area 202 and the main data area via a continuous sequence of logical block addresses LBA 0-LBA N (sectors 211-229).

In FIG. 2, the header area 202 and a portion of the main data area 213-229 are shaded to indicate I/O access from host operating system 104 for header information and main data information, respectively. The logical blocks for virtual disk 128 shown in FIG. 2 are correctly configured for a host operating system 104 with a header size of 1024 bytes. Thus, host operating system 104 I/O access for header information remains in the sectors 211-212 (i.e. the prefix). Main data information accessed by host operating system 104 is shown by a different shade in sectors 213-220. In this example, host operating system 104 I/O access is aligned with the underlying physical storage blocks as the host operating system 104 access of the main data information occurs at the start of a physical storage block 204 (i.e. at byte 0 of physical storage block 204), shown by marker 210.

Figure 3:
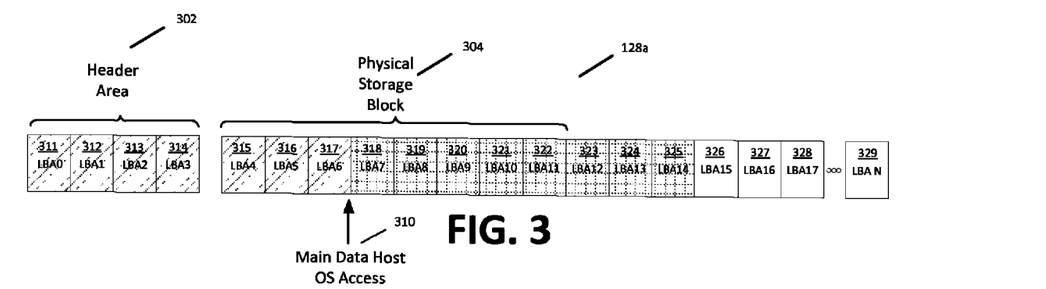
FIG. 3 is a logical block diagram representing a collection of storage sectors for a virtual disk with misaligned I/O access from the host operating system according to certain exemplary embodiments, where header information of the host operating system is larger in size than the number of storage sectors dedicated to header information.

When host operating system I/O access of main data information occurs before or after the start of a physical storage block, the I/O access is considered misaligned. A variety of factors can contribute to misalignment of host operating system I/O access. For example, installing a new host operating system without changing the partition scheme of the virtual disk 128 may introduce a host operating system with header information sized differently from the header area 202 dedicated to header information in the virtual disk 128. FIG. 3 depicts logical blocks of a virtual disk 128a with misaligned I/O access from a host operating system 104, where the header information of the host operating system 104 is larger than the allocated size of the header area.

The virtual disk 128a shown in FIG. 3 includes a first set of sectors 311-314 comprising a header area 302 dedicated to header information of host operating system 104. Virtual disk 128a also includes a second set of sectors 315-329 dedicated to main data information of the host operating system 104. The second set of sectors 315-329 dedicated to main data information is partitioned into 512-byte logical blocks from physical storage blocks 304 and additional physical storage blocks as necessary to accommodate 'N' number of storage sectors. The shading in the sectors 311-317 depicts I/O access of host operating system 104 for header information. Similarly, shading in the sectors 318-325 depicts I/O access of host operating system 104 main data information. In virtual disk 128a, header information for host operating system 104 is larger than the first set of sectors 311-314 dedicated to the header information. When the header information is larger than the header area 302 dedicated to the header information, the host operating system 104 begins main data access after the start of the physical storage block 304. In this example, host operating system I/O access of main data information begins at LBA 7 (shown at marker 310). The host operating system 104 I/O access is thus misaligned with the underlying storage system.

Figure 4:
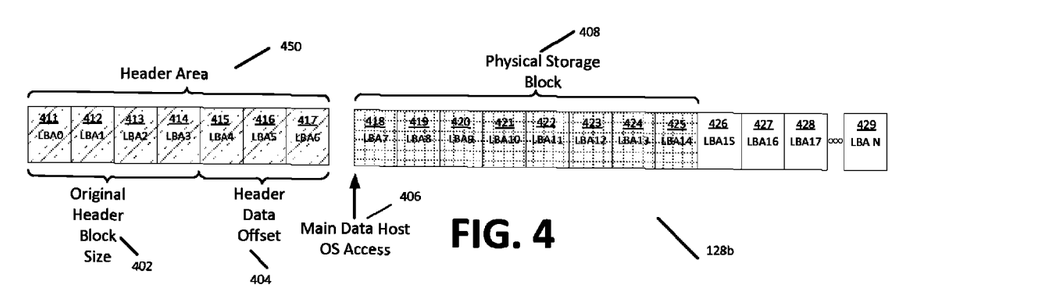
FIG. 4 is a logical block diagram representing a collection of storage sectors for a second virtual disk used to align I/O access from the host operating system access depicted in FIG. 3, according to certain exemplary embodiments.

In certain embodiments, the storage operating system 124 can align I/O access of the host operating system 104 by initializing a new virtual disk that accommodates for the incorrect header size from the original virtual disk via a data offset. FIG. 4 depicts logical blocks for virtual disk 128b used to align the misaligned I/O access depicted in FIG. 3. To align the host operating system I/O access with the underlying storage system, the storage operating system 124 determines the size of the data offset in virtual disk 128a. The size of the data offset comprises the difference in size between the actual size of the host operating system 104 header information and the size of the header area 302 allocated for header information in virtual disk 128a. Storage operating system 124 initializes virtual disk 128b based on the size of the data offset.

For example, storage operating system 124 allocates a set of sectors 411-417 dedicated to the host operating system 104 header information. The size of the set of sectors 411-417 (i.e. the header area 450) is the size of the original header area 402 in virtual disk 128a summed with the size of the data offset 404. The storage operating system 124 allocates a set of sectors 418-429 dedicated to the main data information. Because the 512 byte logical blocks that comprise virtual disk 128b can be distributed in sets of 4 kB physical blocks across the connected storage devices (or other sizes per the size of the physical storage blocks in the underlying storage system), the storage operating system 124 can partition the underlying physical storage blocks such that the start of the set of sectors dedicated to main data information (sector 418) occurs at the start of physical storage block 408.

The data offset 404 accommodates for the larger size of the host operating system 104 header information. As such, I/O access from host operating system 104 begins at the start of physical storage block 408 (sector 418) and is aligned with the underlying storage system.

Figure 5:
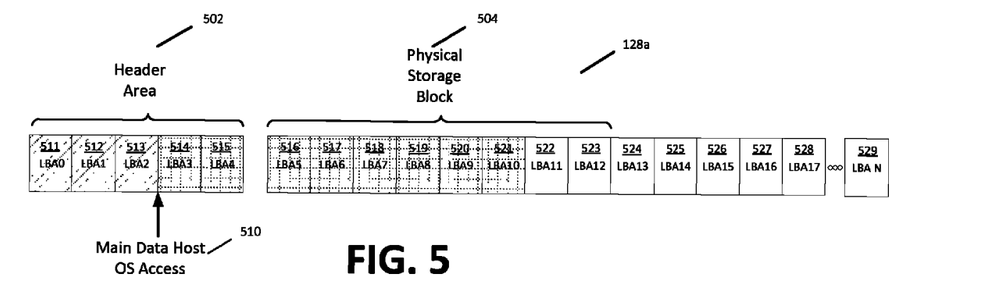
FIG. 5 is a block diagram representing a collection of storage sectors for a virtual disk with misaligned I/O access from the host operating system according to certain exemplary embodiments, where header information of the host operating system is smaller in size than the number of storage sectors dedicated to header information.

FIG. 5 depicts another example for logical blocks of a virtual disk 128a with misaligned I/O access from host operating system 104. In FIG. 5, the header information of the host operating system 104 is smaller than the allocated size of the header area. The virtual disk 128a includes a first set of sectors 511-515 comprising a header area 502 dedicated to header information of host operating system 104. Virtual disk 128a also includes a second set of sectors 516-529 dedicated to main data information of the host operating system 104. The second set of sectors 516-529 dedicated to main data information is partitioned into 512-byte logical blocks from physical storage blocks 504 and additional physical storage blocks as necessary to accommodate 'N' number of storage sectors. The shading in the sectors 511-513 depicts I/O access of host operating system 104 for header information. The shading in the sectors 514-521 depicts I/O access of host operating system 104 for main data information. In virtual disk 128a, header information for host operating system 104 is smaller than the first set of sectors 511-515 dedicated to the header information. When the header information is smaller than the header area 502, the host operating system 104 begins main data access before the start of physical storage block 504. In this example, host operating system I/O access of main data information begins at LBA3 (shown at marker 510). The host operating system 104 I/O access is thus misaligned with the underlying storage system.

Figure 6:
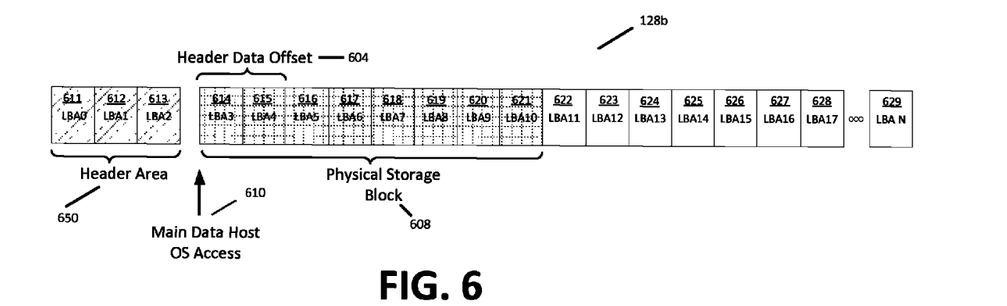
FIG. 6 is a block diagram representing a collection of storage sectors for a second virtual disk used to align I/O access from the host operating system access depicted in FIG. 5, according to certain exemplary embodiments.

FIG. 6 depicts logical blocks for virtual disk 128b used to align the misaligned I/O access depicted in FIG. 5. To align the host operating system I/O access with the underlying storage system, the storage operating system 124 determines the size of the data offset in virtual disk 128a. As discussed in reference to FIG. 4, the size of the data offset comprises the difference in size between the actual size of the host operating system 104 header information and the size of the header area 502 allocated for header information in virtual disk 128a. Storage operating system 124 initializes virtual disk 128b based on the size of the data offset. When the header information of the host operating system 104 is smaller than the header area 502, the storage operating system 124 initializes virtual disk 128b with a header area smaller than the header area 502 in virtual disk 128a, the difference in size corresponding to the size of the data offset.

For example, storage operating system 124 allocates a set of sectors 611-613 dedicated to the host operating system 104 header information. The size of the set of sectors 611-613 (i.e. the new header area 650) is size of the original header area 502 less the size of the data offset 604. The storage operating system 124 allocates a set of sectors 614-629 dedicated to the main data information. As discussed above with reference to FIG. 4, the storage operating system 124 can partition the underlying physical storage blocks such that the start of the set of sectors dedicated to main data information (sector 614) occurs at the start of the physical storage block 608 (shown by marker 610). The I/O access from host operating system 104 is thus aligned with the underlying storage system.

Figure 7:
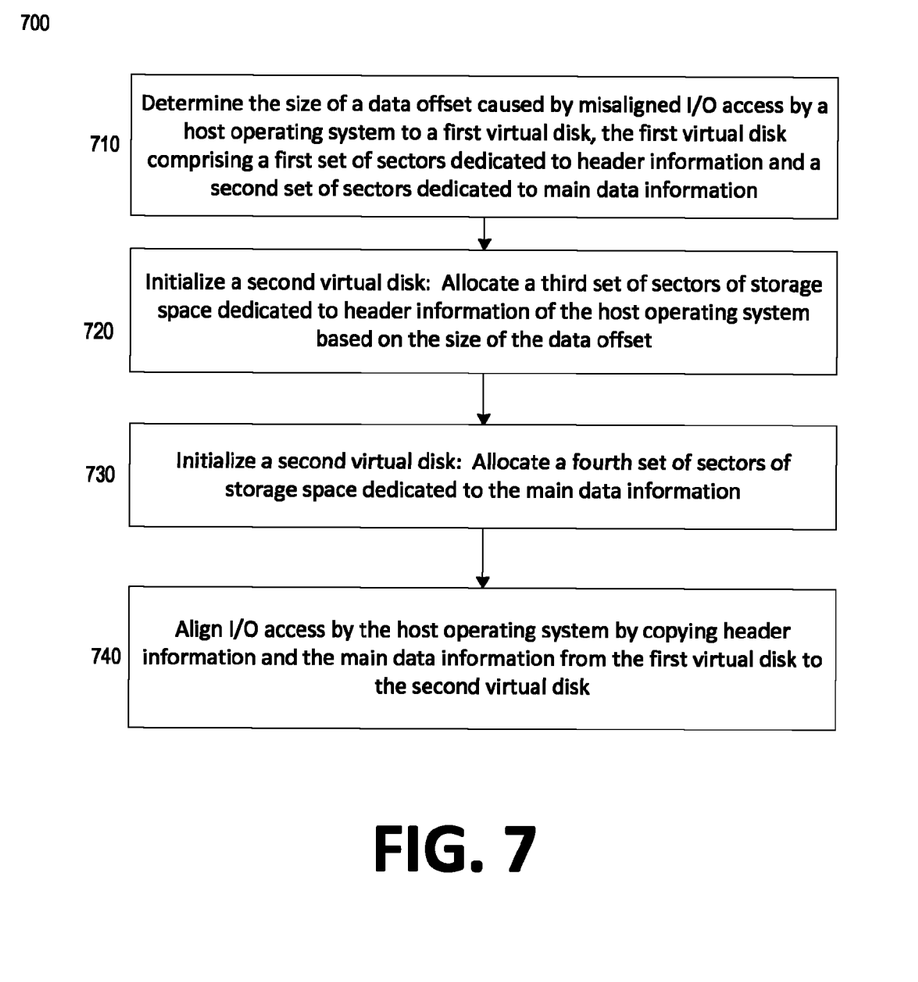
FIG. 7 is a flowchart depicting an example of a process for aligning I/O access by a host operating system to a virtual disk.

FIG. 7 is a flowchart illustrating an example of a method 700 performed by a storage operating system 124 for aligning I/O access by the host operating system 104 to the underlying storage system. For illustrative purposes, the method 700 is described with reference to the system implementation depicted in FIGS. 1-6. Other implementations, however, are possible.

The method 700 involves determining the size of a data offset caused by misaligned I/O access by a host operating system to a first virtual disk, as shown in block 710. The first virtual disk comprises a first set of sectors 311-314 dedicated to header information and a second set of sectors 315-329 dedicated to main data information. To determine the size of the data offset, the storage operating system 124 can query or analyze the underlying physical storage blocks (e.g., physical storage block 304) for the first virtual disk 128a. The storage operating system 124 can analyze the I/O access patterns from the host operating system 104 to determine the data offset. The storage operating system 124 can identify the position within the physical storage block 304 where the host operating system 104 I/O for the main data information actually begins. The storage operating system 124 can also determine the length of I/O access of the overflow (if the header information of the host operating system is greater than the header area) or underflow (if the header information of the host operating system is less than the header area) of header information.

In one example, the storage operating system 124 can analyze I/O access patterns from the host operating system 104 and maintain a histogram of the I/O access. The histogram can track, for example, the frequency of I/O access for each I/O offset modulo the physical block size. If the storage operating system 124 detects that a majority (e.g., >50%) of host I/O access occurs at the "zero" sector offset, the storage operating system 124 determines that the host I/O access is aligned. If the storage operating system 124 detects that a majority of host I/O access occurs at a different sector offset, the storage operating system 124 can determine the data offset based on the amount of the sector offset.

As another example, with reference to FIG. 3, the storage operating system 124 can determine that host operating system I/O access of main data information occurs 1536 bytes into physical storage block 304. The storage operating system 124 can also determine that the host operating system I/O access of header information occurs beyond header area 302 with a 1536 byte overflow into physical storage block 304. As the size of each logical block in this example is 512 bytes, the storage operating system 124 determines that the size of the data offset is a three 512-byte logical block overflow. Similarly, with reference to FIG. 5, the storage operating system 124 can determine that the host operating system I/O access of main data information occurs 1024 bytes before the end of header area 502. The storage operating system 124 can determine that the size of the data offset is a two 512-byte logical block underflow.

In another embodiment, the storage system 120 can receive manual input specifying the data offset from an operator entering the offset data in a user interface of the storage system 120.

In another embodiment, the storage system 120 can receive an input specifying the source path for the first virtual disk 128*a* and an identifier identifying the host operating system that is accessing the first virtual disk 128*a*. The memory 122 of storage system 120 can include a database of pre-determined operating system configuration information. For example, the database in memory 122 of the storage system 120 can include a list of possible host operating systems and the pre-determined optimal sizes for the header areas for each possible host operating system. Based on the input identifying the current host operating system 104, the storage operating system 124 can identify the optimal header area that would result in aligned I/O access from host operating system 104. The storage operating system 124 can then determine the size of the data offset by determining the difference between the current size of the header area used by host operating system 104 in virtual disk 128*a* with the size of the optimal header area for host operating system 104 indicated in the database in memory 122.

The method 700 further involves initializing a second virtual disk by allocating a third set of sectors of storage space dedicated to header information of the host operating system, as shown in block 720. The size of the third set of sectors of storage space is based on the size of the determined data offset. For example, with reference to FIG. 4, the storage operating system 124 allocates, from the physical data blocks of connected host devices, the third set of sectors 411-417 dedicated to header information. The size of the third set of sectors 411-417 (i.e. the new header area 450) comprises the original header area size 402 (four 512-byte logical blocks) summed with the size of the determined data offset 404 (three 512-byte logical blocks). With reference to FIG. 6, the storage operating system 124 allocates the third set of sectors 611-613 dedicated to header information. The size of the third set of sectors 611-613 (i.e. the new header area 650) comprises the original header area size 502 less the size of the data offset 604.

Initializing the second virtual disk further involves allocating a fourth set of sectors of storage space dedicated to the main data information, as shown in block 730. For example, the storage operating system 124 can allocate an 'N' number of storage sectors for main data information. The 'N' number of storage sectors is chosen so that the number of sectors in the first set of sectors summed with the number of sectors in the second set of sectors should equal the number of sectors in the third set of sectors summed with the number of sectors in the fourth set of sectors. The number of sectors allocated for the fourth set of sectors of storage space thus increases or decreases by the data offset number as compared to the number of sectors in the second set of sectors.

Initialization of the second virtual disk can be triggered either automatically by the storage operating system 124 or via manual input by an operator, such as a system administrator. For example, the storage system 120 can receive an input from an operator using a user interface of the storage system 120. Upon receiving the command to initiate the second virtual disk 128*b*, the storage operating system 124 can allocate the sectors of storage as described above.

Alternatively, the storage system can automatically detect that I/O access from the host operating system 104 occurs at an offset by analyzing I/O patterns as described above with respect to block 710. Upon detecting a data offset, the storage operating system 124 can automatically initialize a second virtual disk 128*b* with corrected partitioning for header information and the main data information. In this aspect, the storage operating system 124 can detect a data offset and initialize the second virtual disk 128*b* without requiring operator intervention.

The method 700 further includes aligning I/O access by the host operating system by copying header information and main data information from the first virtual disk to the second virtual disk, as shown in block 740. With reference to FIGS. 3 and 4, the storage operating system 124 copies information from sectors 311-317 comprising the host operating system header information to sectors 411-417. Similarly, the storage operating system 124 copies information from sectors 318-329 comprising the main data information to sectors 418-429. The copied data can be indistinguishable to the host operating system 104 from the data in the first virtual disk 128*a*. Thus, host operating system 104 can continue I/O operations with the second virtual disk 128*b* without disruption.

The data transfer can occur as a system background process while the host operating system 104 continues to perform I/O access with the first virtual disk 128*a*. For example, storage system 120 can include multiprocessing capabilities. Storage operating system 124 can continue providing I/O access between the host device 100 and virtual disk 128*a* in a first process while the storage operating system 124 copies information from the first virtual disk 128*a* to the second virtual disk 128*b* via a second process executing in the background. Upon transferring the header information and main data information to the second virtual disk 128*b*, the storage operating system 124 can reassign the host operating system 104 from the first virtual disk 128*a* to the second virtual disk 128*b*. Since the header information and main data information were copied to the second virtual disk 128*b* via a background process, reassigning the host operating system 104 to the second virtual disk 128*b* can occur non-disruptively. In other words, host operating system 104 switches from performing I/O access with virtual disk 128*a* to performing I/O access with virtual disk 128*b* without interruption.

In embodiments described herein, the storage operating system 124 can determine data offset caused from misaligned I/O access from a host operating system, as explained above with respect to block 710. The storage operating system 124 can determine the data offset by querying and analyzing the underlying storage system, not requiring operator input. Further, as described above, initializing the second virtual disk 128*b* and copying the header information and main data information from the first virtual disk 128*a* to the second virtual disk 128*b* can automatically occur as a background process while the host operating system may continue I/O access and execute operations with the first virtual disk 128*a*. Certain embodiments thus provide systems and methods for the storage operating system 124 to automatically align I/O access from host operating system with the underlying storage system without requiring operator input and without causing disruption ongoing I/O from the host device 104.

Figure 8:
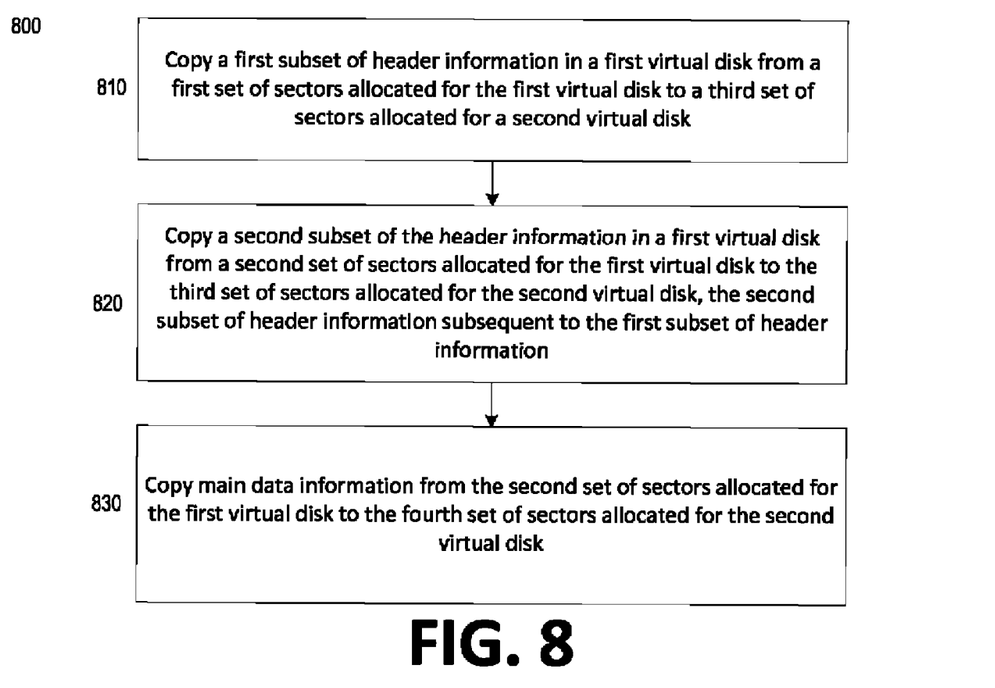
FIG. 8 is a flowchart depicting an example of a process for copying information from the first virtual disk to the second virtual disk according to certain exemplary embodiments, where the header information is larger than a set of sectors dedicated to header data.
Figure 9:
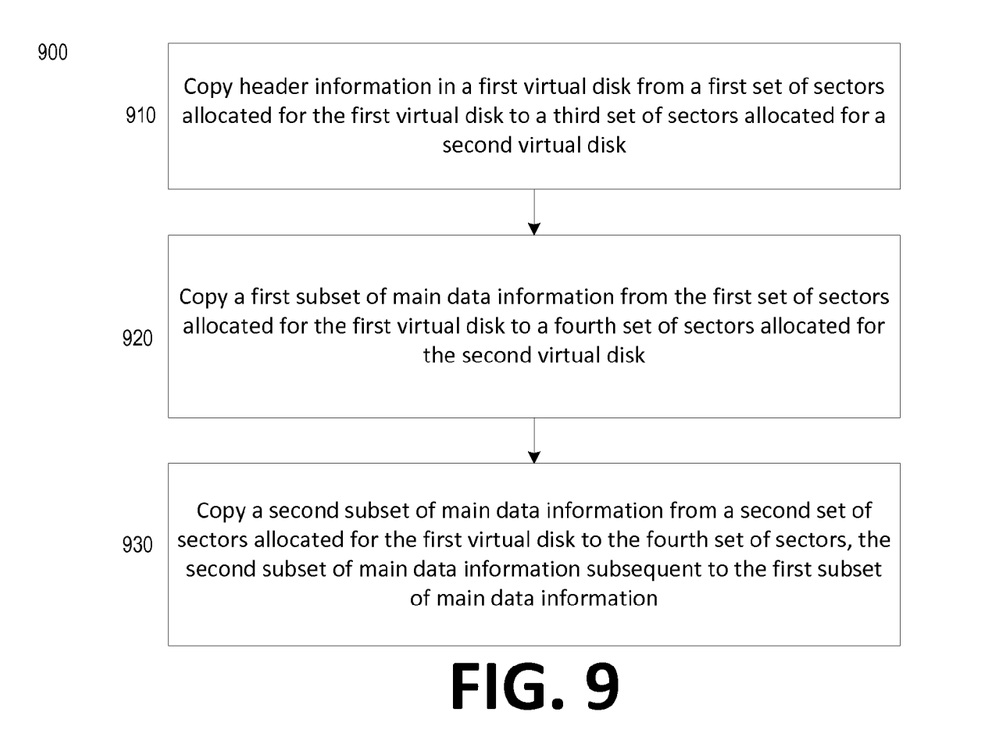
FIG. 9 is a flowchart depicting an example of a process for copying information from the first virtual disk to the second virtual disk according to certain exemplary embodiments, where the header information is smaller than a set of sectors dedicated to header data.

FIGS. 8 and 9 are flowcharts depicting additional details regarding aligning the I/O access by copying header and main data information from the first virtual disk to the second virtual disk. FIG. 8 is a flowchart showing an example process 800 for aligning I/O access of the host operating system when the header information of the host operating system is greater than the size of the allocated header area in the first virtual disk. The process shown in FIG. 8 can begin after block 730 shown in FIG. 7.

Process 800 involves copying a first subset of header information in the first virtual disk 128a from a first set of sectors allocated to the first virtual disk 128a to a third set of sectors allocated to a second virtual disk 128b, as shown in block 810. For example, with reference to FIGS. 3 and 4, the header information of the host operating system 104 overflows from header area 302 into physical storage block 304. To begin aligning the I/O access, the storage operating system 124 can copy the first subset of header information found in the header area (i.e. information in sectors 311-314) to the third set of sectors 411-414 allocated to the second virtual disk 128b.

Process 800 further involves copying a second subset of the header information in the first virtual disk from the second set of sectors allocated to the first virtual disk to the third set of sectors allocated to the second virtual disk, as shown in block 820. Again referring to FIGS. 3 and 4, the storage operating system 124 copies the remainder of the header data information in the first virtual disk 128a (found in sectors 315-317) to the remainder of the third set of sectors 415-517. The second subset of the header information (i.e. header information found in sectors 315-317) occurs subsequent to the first subset of the header information (i.e. header information found in sectors 311-314).

Process 800 further involves copying main data information from the second set of sectors allocated to the first virtual disk to the fourth set of sectors allocated to the second virtual disk, as shown in block 830. Storage operating system 124 copies information in the set of sectors 318-329 in the first virtual disk 128a to the fourth set of sectors 418-429 in second virtual disk 128b. By copying the header information and main data information from the first virtual disk 128a to the second virtual disk 128b with corrected partitioning, the storage operating system 124 effectively aligns the I/O access from the host operating system 104.

FIG. 9 is a flowchart showing an example of process 900 for aligning I/O access of the host operating system when the header information of the host operating system is less than the size of the allocated header area in the first virtual disk. The process shown in FIG. 9 can begin after block 730 shown in FIG. 7.

Process 900 involves copying header information in a first virtual disk from a first set of sectors allocated to a first virtual disk to a third set of sectors allocated to a second virtual disk, as shown in block 910. For example, with reference to FIGS. 5 and 6, for performing I/O access for header information, the host operating system 104 does not utilize all of the sectors 511-515 allocated as the header area 502. In consequence, I/O access of main data information begins during the header area 502 and before the start of the physical storage block 516. Storage operating system 124 can copy the header information in sectors 511-513 in virtual disk 128a to a third set of sectors 611-613 allocated to the second virtual disk 128b.

Process 900 further involves copying a first subset of main data information from the first set of sectors allocated to the first virtual disk to a fourth set of sectors allocated to the second virtual disk, as shown in block 920. Again referencing FIGS. 5 and 6, the storage operating system 124 copies the subset of main data information that exists in the header area 502 of the first virtual disk 128a (i.e. main data information in sectors 514-515) to a portion of the fourth set of sectors 614-629 (i.e. the portion being sectors 614-615).

Process 900 further involves copying a subset of main data information from the second set of sectors allocated to the first virtual disk to the fourth set of sectors, as shown in block 930. For example, the storage operating system 124 copies the remainder of the main data information found in the second set of sectors 516-529 to the remainder of the fourth set of sectors 616-629. By copying the header information and main data information from the first virtual disk 128a to the second virtual disk 128b with corrected partitioning, the storage operating system 124 effectively aligns the I/O access from the host operating system 104.

Figure 10:
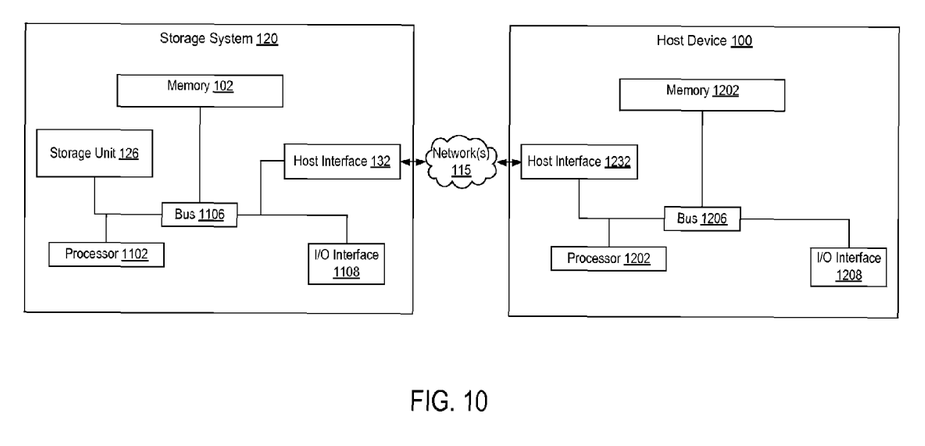
FIG. 10 is a block diagram illustrating the computing system of FIG. 1, according to certain exemplary embodiments, with additional hardware components for executing the features herein.

Any suitable computing system or groups of computing systems can be used to implement the storage system 120 and the host device 100. FIG. 10 is a block diagram depicting an example of a storage system 120 communicating over a network 115 with a host device 100. As mentioned above with respect to FIG. 1, host device 100 can also be directly coupled to storage system 120 via a standard I/O interface. FIG. 10 also depicts additional hardware components of the storage system 120 and the host device 100 for executing the processes described herein.

The storage system 120 can include a processor 1102 that is communicatively coupled to the memory 122 and that executes computer-executable program code and/or accesses information stored in the memory 102. For example, as shown in FIG. 1, the memory 122 can include instructions for executing storage operating system 124 and the processes described herein. The memory 122 can be communicatively coupled to the storage unit 126, which includes the connected storage devices as discussed with reference to FIG. 1.

The processor 1102 may comprise a microprocessor, an application-specific integrated circuit ("ASIC"), a state machine, or other processing device. The processor 1102 can include any of a number of processing devices, including one. Such a processor 1102 can include or may be in communication with a computer-readable medium (e.g. memory 122) storing instructions that, when executed by the processor 1102, cause the processor to perform the operations described herein for aligning host operating system 104 I/O access with the underlying storage in storage system 120.

The memory 122 can be or include any suitable non-transitory computer-readable medium. The computer-readable medium can include any electronic, optical, magnetic, or other storage device capable of providing a processor with computer-readable instructions or other program code. Non-limiting examples of a computer-readable medium include a floppy disk, CD-ROM, DVD, magnetic disk, memory chip, ROM, RAM, an ASIC, a configured processor, optical storage, magnetic tape or other magnetic storage, or any other medium from which a computer processor can read instructions. The program code or instructions may include processor-specific instructions generated by a compiler and/or an interpreter from code written in any suitable computer-programming language, including, for example, C, C++, C#, Visual Basic, Java, Python, Perl, JavaScript, and ActionScript. The storage system 120 can execute program code that configures the processor 1102 to perform one or more of the operations described above with respect to FIGS. 1, 7-9.

The storage system 120 may also comprise a number of external or internal devices such as input or output devices. For example, the storage system 120 is shown with an input/output ("I/O") interface 1108 that can receive input from input devices or provide output to output devices. A bus 1106 can also be included in the storage system 120. The bus 1106 can communicatively couple one or more components of the storage system 120.

The storage system 120 can also include at least one host interface 132. The host interface 132 can include any device or group of devices suitable for establishing a wired or wireless data connection to one or more data networks 115 or directly to host interface 1232 of host device 100. Non-limiting examples of the host interface 132 include an Ethernet network adapter, a modem, and/or the like to establish a TCP/IP connection with the host device 100 or a SCSI interface, USB interface, or a fiber wire interface to establish a direct connection with the host device 100.

The host device 100 includes similar components to storage system 120. For example, host device 100 includes memory 1202, host interface 1232, a processor 1202, and an I/O interface 1208 all communicatively coupled via a bus 1206. The components in host device 100 function in a similar manner to the components described with respect to storage system 120.

Those skilled in the art will appreciate that a typical storage system 120 and host device 100 will include hardware and software components other than those shown in FIGS. 1 and 10, which were provided by way of example only and not by way of limitation.

General Considerations

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

Some embodiments described herein may be conveniently implemented using a conventional general purpose or a specialized digital computer or microprocessor programmed according to the teachings herein, as will be apparent to those skilled in the computer art. Some embodiments may be implemented by a general purpose computer programmed to perform method or process steps described herein. Such programming may produce a new machine or special purpose computer for performing particular method or process steps and functions (described herein) pursuant to instructions from program software. Appropriate software coding may be prepared by programmers based on the teachings herein, as will be apparent to those skilled in the software art. Some embodiments may also be implemented by the preparation of application-specific integrated circuits or by interconnecting an appropriate network of conventional component circuits, as will be readily apparent to those skilled in the art. Those of skill in the art will understand that information may be represented using any of a variety of different technologies and techniques.

Some embodiments include a computer program product comprising a computer readable medium (media) having instructions stored thereon/in that, when executed (e.g., by a processor), cause the executing device to perform the methods, techniques, or embodiments described herein, the computer readable medium comprising instructions for performing various steps of the methods, techniques, or embodiments described herein. The computer readable medium may comprise a non-transitory computer readable medium. The computer readable medium may comprise a storage medium having instructions stored thereon/in which may be used to control, or cause, a computer to perform any of the processes of an embodiment. The storage medium may include, without limitation, any type of disk including floppy disks, mini disks (MDs), optical disks, DVDs, CD-ROMs, micro-drives, and magneto-optical disks, ROMs, RAMs, EPROMs, EEPROMs, DRAMs, VRAMs, flash memory devices (including flash cards), magnetic or optical cards, nanosystems (including molecular memory ICs), RAID devices, remote data storage/archive/warehousing, or any other type of media or device suitable for storing instructions and/or data thereon/in.

Stored on any one of the computer readable medium (media), some embodiments include software instructions for controlling both the hardware of the general purpose or specialized computer or microprocessor, and for enabling the computer or microprocessor to interact with a human user and/or other mechanism using the results of an embodiment. Such software may include without limitation device drivers, operating systems, and user applications. Ultimately, such computer readable media further includes software instructions for performing embodiments described herein. Included in the programming (software) of the general-purpose/specialized computer or microprocessor are software modules for implementing some embodiments.

The various illustrative logical blocks, modules, and circuits described in connection with the embodiments disclosed herein may be implemented or performed with a general-purpose processing device, a digital signal processor (DSP), an application-specific integrated circuit (ASIC), a field programmable gate array (FPGA) or other programmable logic device, discrete gate or transistor logic, discrete hardware components, or any combination thereof designed to perform the functions described herein. A general-purpose processing device may be a microprocessor, but in the alternative, the processor may be any conventional processor, controller, microcontroller, or state machine A processing device may also be implemented as a combination of computing devices, e.g., a combination of a DSP and a microprocessor, a plurality of microprocessors, one or more microprocessors in conjunction with a DSP core, or any other such configuration Aspects of the methods disclosed herein may be performed in the operation of such processing devices. The order of the blocks presented in the figures described above can be varied—for example, some of the blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation and are not meant to be limiting.

While the present subject matter has been described in detail with respect to specific examples thereof, it will be appreciated that those skilled in the art, upon attaining an understanding of the foregoing may readily produce alterations to, variations of, and equivalents to such aspects and examples. Accordingly, it should be understood that the present disclosure has been presented for purposes of example rather than limitation, and does not preclude inclusion of such modifications, variations, and/or additions to the present subject matter as would be readily apparent to one of ordinary skill in the art.

What is claimed is:

1. A method, comprising:
   determining a size of a data offset caused by misaligned I/O access by a host operating system with a first virtual disk, wherein the first virtual disk comprises a first set of sectors of storage space dedicated to header information of the host operating system and a second set of sectors of storage space dedicated to main data information for the host operating system, wherein the misaligned I/O access is caused by the header information of the host operating system sized differently from the first set of sectors, causing the host operating system to access the main data information after accessing a first byte of a physical storage block of the storage space;
   initializing a second virtual disk by:
      allocating a third set of sectors of storage space dedicated to the header information of the host operating system, wherein the third set of sectors is different in size compared to the first set of sectors, the difference in size between the first set of sectors and the third set of sectors comprising the size of the data offset, and
      allocating a fourth set of sectors of storage space dedicated to the main data information; and
   aligning I/O access by the host operating system by copying the header information and the main data information from the first virtual disk to the second virtual disk.

2. The method of claim 1, wherein the misaligned I/O access is caused by the header information of the host operating system sized larger than the first set of sectors, and wherein copying the header information and the main data information from the first virtual disk to the second virtual disk comprises:
   copying a first subset of the header information from the first set of sectors to the third set of sectors;
   copying a second subset of the header information of the host operating system from the second set of sectors to the third set of sectors, wherein the second subset of the header
information is subsequent to the first subset of the header information; and
   copying the main data information from the second set of sectors to the fourth set of sectors, wherein a first byte of the fourth set of sectors comprises a start of a physical block of the storage space.

3. The method of claim 1, wherein the misaligned I/O access is caused by the header information of the host operating system sized smaller than the first set of sectors, and wherein copying the header information and the main data information from the first virtual disk to the second virtual disk comprises:
   copying the header information from the first set of sectors to the third set of sectors;
   copying a first subset of the main data information from the first set of sectors to the fourth set of sectors, wherein the host operating system access of the main data information starts at a first byte of the fourth set of sectors, and wherein the first byte of the fourth set of sectors comprises a start of a physical block of the storage space; and
   copying a second subset of the main data information from the second set of sectors to the fourth set of sectors, wherein the second subset of the main data information is subsequent to the first subset of the main data information.

4. The method of claim 1, wherein
   the copied header information and the copied main data information included in the second virtual disk as presented to the host operating system is indistinguishable from the header information and the main data information in the first virtual disk.

5. The method of claim 1, further comprising:
   receiving an input specifying a source path of the first virtual disk and an identifier identifying the host operating system;
   identifying an optimal header area size from pre-determined operating system information stored in a memory of the storage system, wherein the operating system information specifies pre-determined sizes of data offsets for different host operating systems,
   wherein the size of the data offset is determined by comparing an actual header area size in the first virtual disk with the optimal header area size.

6. The method of claim 1 wherein the size of the data offset is determined by receiving an input specifying a source path of the first virtual disk and the size of the data offset.

7. The method of claim 1, wherein determining the size of the data offset comprises analyzing I/O patterns from the host operating system to the first virtual disk, and the method further comprising:
   reassigning the host operating system from the first virtual disk to the second virtual disk without requiring operator intervention to trigger the assignment.

8. A non-transitory computer-readable medium having stored thereon instructions for performing a method comprising machine executable code which when executed by at least one machine, causes the machine to:
   determine a size of a data offset caused by misaligned I/O access by a host operating system with a first virtual disk, wherein the first virtual disk comprises a first set of sectors of storage space dedicated to header information of the host operating system and a second set of sectors of storage space dedicated to main data information for the host operating system, wherein the misaligned I/O access is caused by the header information of the host operating system sized differently from the first set of sectors, causing the host operating system to access the main data information after accessing a first byte of a physical storage block of the storage space;
   initialize a second virtual disk by:
   allocating a third set of sectors of storage space dedicated to the header information of the host operating system, wherein the third set of sectors is different in size compared to the first set of sectors, the difference in size between the first set of sectors and the third set of sectors comprising the size of the data offset, and
   allocating a fourth set of sectors of storage space dedicated to the main data information; and align I/O access by the host operating system by copying the header information and the main data information from the first virtual disk to the second virtual disk.

9. The non-transitory computer-readable medium of claim 8, wherein the misaligned I/O access is caused by the header information of the host operating system sized larger than the first set of sectors, and wherein copying the header information and the main data information from the first virtual disk to the second virtual disk comprises:
copying a first subset of the header information from the first set of sectors to the third set of sectors;
copying a second subset of the header information of the host operating system from the second set of sectors to the third set of sectors, wherein the second set subset of the header information is subsequent to the first subset of the header information; and
copying the main data information from the second set of sectors to the fourth set of sectors, wherein a first byte of the fourth set of sectors comprises a start of a physical block of the storage space.

10. The non-transitory computer-readable medium of claim 8, wherein the misaligned I/O access is caused by the header information of the host operating system sized smaller than the first set of sectors, and wherein copying the header information and the main data information from the first virtual disk to the second virtual disk comprises:
copying the header information from the first set of sectors to the third set of sectors; copying a first subset of the main data information from the first set of sectors to the fourth set of sectors, wherein the host operating system access of the main data information starts at a first byte of the fourth set of sectors, and wherein the first byte of the fourth set of sectors comprises a start of a physical block of the storage space; and
copying a second subset of the main data information from the second set of sectors to the fourth set of sectors, wherein the second subset of the main data information is subsequent to the first subset of the main data information.

11. The non-transitory computer-readable medium of claim 8, wherein the copied header information and the copied main data information included in the second virtual disk as presented to the host operating system is indistinguishable from the header information and the main data information in the first virtual disk.

12. The non-transitory computer-readable medium of claim 8, wherein the instructions stored thereon further cause the machine to:
receive an input specifying a source path of the first virtual disk and an identifier identifying the host operating system;
identify an optimal header area size from pre-determined operating system information stored in a memory of the storage system, wherein the operating system information specifies pre-determined sizes of data offsets for different host operating systems,
wherein the size of the data offset is determined by comparing an actual header area size in the first virtual disk with the optimal header area size.

13. The non-transitory computer-readable medium of claim 8, wherein the size of the data offset is determined by receiving an input specifying a source path of the first virtual disk and the size of the data offset.

14. The non-transitory computer-readable medium of claim 8, wherein determining the size of the data offset comprises analyzing I/O patterns from the host operating system to the first virtual disk, and wherein the instructions stored in the non-transitory computer-readable medium further cause the machine to:
reassign the host operating system from the first virtual disk to the second virtual disk without requiring operator intervention to trigger assignment.

15. A storage system, comprising:
a processor device; and
a memory device including program code stored thereon, wherein the program code, upon execution by the processor device, performs operations comprising:
determining a size of a data offset caused by misaligned I/O access by a host operating system with a first virtual disk, wherein the first virtual disk comprises a first set of sectors of storage space dedicated to header information of the host operating system and a second set of sectors of storage space dedicated to main data information for the host operating system, wherein the misaligned I/O access is caused by the header information of the host operating system sized differently from the first set of sectors, causing the host operating system to access the main data information after accessing a first byte of a physical storage block of the storage space;
initializing a second virtual disk by:
allocating a third set of sectors of storage space dedicated to the header information of the host operating system, wherein the third set of sectors is different in size compared to the first set of sectors, the difference in size between the first set of sectors and the third set of sectors comprising the size of the data offset, and
allocating a fourth set of sectors of storage space dedicated to the main data information; and
aligning I/O access by the host operating system by copying the header information and the main data information from the first virtual disk to the second virtual disk.

16. The storage system of claim 15, wherein the misaligned I/O access is caused by the header information of the host operating system sized larger than the first set of sectors, and wherein copying the header information and the main data information from the first virtual disk to the second virtual disk comprises:
copying a first subset of the header information from the first set of sectors to the third set of sectors;
copying a second subset of the header information of the host operating system from the second set of sectors to the third set of sectors, wherein the second set subset of the header information is subsequent to the first subset of the header information; and
copying the main data information from the second set of sectors to the fourth set of sectors, wherein a first byte of the fourth set of sectors comprises a start of a physical block of the storage space.

17. The storage system of claim 15, wherein the misaligned I/O access is caused by the header information of the host operating system sized smaller than the first set of sectors, and wherein copying the header information and the main data information from the first virtual disk to the second virtual disk comprises:
copying the header information from the first set of sectors to the third set of sectors;
copying a first subset of the main data information from the first set of sectors to the fourth set of sectors, wherein the host operating system access of the main data information starts at a first byte of the fourth set of sectors, and wherein the first byte of the fourth set of sectors comprises a start of a physical block of the storage space; and copying a second subset of the main data information from the second set of sectors to the fourth set of sectors, wherein the second subset of the main data information is subsequent to the first subset of the main data information.

18. The storage system of claim 15, wherein the program code, upon execution by the processor device, performs operations further comprising:

receiving an input specifying a source path of the first virtual disk and an identifier identifying the host operating system;

identifying an optimal header area size from pre-determined operating system information stored in a memory of the storage system, wherein the operating system information specifies pre-determined sizes of data offsets for different host operating systems, wherein the size of the data offset is determined by comparing an actual header area size in the first virtual disk with the optimal header area size.

19. The storage system of claim 15, wherein the size of the data offset is determined by receiving an input specifying a source path of the first virtual disk and the size of the data offset.

20. The storage system of claim 15, wherein determining the size of the data offset comprises analyzing I/O patterns from the host operating system to the first virtual disk, and the program code, upon execution by the processor device, performs operations further comprising:

reassigning the host operating system from the first virtual disk to the second virtual disk without requiring operator intervention to trigger assignment.

* * * * *